(12) United States Patent
Miura et al.

(10) Patent No.: US 10,974,722 B2
(45) Date of Patent: Apr. 13, 2021

(54) VEHICLE CONTROL APPARATUS, VEHICLE CONTROL METHOD, AND STORAGE MEDIUM

(71) Applicant: HONDA MOTOR CO., LTD., Tokyo (JP)

(72) Inventors: Hiroshi Miura, Wako (JP); Makoto Ishikawa, Wako (JP); Masamitsu Tsuchiya, Wako (JP); Koji Kawabe, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 260 days.

(21) Appl. No.: 16/147,922

(22) Filed: Oct. 1, 2018

(65) Prior Publication Data
US 2019/0106107 A1    Apr. 11, 2019

(30) Foreign Application Priority Data
Oct. 5, 2017   (JP) ............................. JP2017-195199

(51) Int. Cl.
*B60W 30/12* (2020.01)
*G05D 1/02* (2020.01)

(52) U.S. Cl.
CPC .......... *B60W 30/12* (2013.01); *G05D 1/0223* (2013.01); *B60W 2552/00* (2020.02); *B60W 2720/10* (2013.01); *B60W 2720/24* (2013.01); *G05D 2201/0213* (2013.01)

(58) Field of Classification Search
CPC ............. B60W 30/12; B60W 2552/00; B60W 2720/24; B60W 2720/10; B60W 2420/42; B60W 2552/30; B60W 2552/05; B60W 30/10; B60W 30/18154; B60W 30/09;
(Continued)

(56) References Cited

U.S. PATENT DOCUMENTS

| 2016/0116294 A1* | 4/2016 | Raghu .................... G01C 21/34 701/23 |
| 2016/0272203 A1* | 9/2016 | Otake .................... B60W 50/14 |
| 2019/0276077 A1* | 9/2019 | Itou .......................... B62D 3/12 |

FOREIGN PATENT DOCUMENTS

| JP | 3826385 | 9/2006 |
| JP | 2007-164636 | 6/2007 |
| JP | 2015-079446 | 4/2015 |

(Continued)

OTHER PUBLICATIONS

Japanese Office Action for Japanese Patent Application No. 2017-195199 dated Jun. 4, 2019.

*Primary Examiner* — Genna M Mott
(74) *Attorney, Agent, or Firm* — Amin, Turocy & Watson, LLP

(57) ABSTRACT

A vehicle control apparatus of an embodiment includes a surrounding situation recognition unit which recognizes a situation of surroundings of a vehicle, a branch point recognition unit which recognizes a branch point present in a traveling direction of the vehicle on the basis of the recognition result of the surrounding situation recognition unit, a main lane recognition unit which recognizes a main lane connected to the branch point, and a driving control unit which controls one or both of the steering and acceleration/deceleration of the vehicle and causes the vehicle to travel in the direction of the main lane recognized by the main lane recognition unit at the branch point.

7 Claims, 7 Drawing Sheets

(58) Field of Classification Search
CPC ......... G05D 1/0223; G05D 2201/0213; G06K 9/00798; G08G 1/166
See application file for complete search history.

(56) References Cited

FOREIGN PATENT DOCUMENTS

| | | |
|---|---|---|
| JP | 2015-137047 | 7/2015 |
| JP | 2016-172531 | 9/2016 |

* cited by examiner

VEHICLE CONTROL APPARATUS, VEHICLE CONTROL METHOD, AND STORAGE MEDIUM

CROSS-REFERENCE TO RELATED APPLICATION

Priority is claimed on Japanese Patent Application No. 2017-195199, filed Oct. 5, 2017, the content of which is incorporated herein by reference.

BACKGROUND OF THE INVENTION

Field of the Invention

The present invention relates to a vehicle control apparatus, a vehicle control method, and a storage medium.

Description of Related Art

Recently, research on automatic vehicle control has been conducted. Regarding this, a technology for determining whether there is a junction from map information for a destination during automated driving, changing the junction to an end point of a travel route and continuing automated driving when it is determined that there is a junction, and ending automated driving and switching to a manual driving mode upon arrival at the end point is known (Japanese Patent No. 3826385, for example).

SUMMARY OF THE INVENTION

However, the conventional technology does not take into account that a vehicle may pass through a branch path while continuing automated driving.

An object of embodiments of the present invention devised in view of the aforementioned circumstances is to provide a vehicle control apparatus, a vehicle control method and a storage medium by which a vehicle can pass through a branch path while continuing automated driving.

A vehicle control apparatus, a vehicle control method and a storage medium according to the present invention employ the following configurations.

(1): A vehicle control apparatus according to one aspect of the present invention is a vehicle control apparatus including: a surrounding situation recognition unit which recognizes a situation of surroundings of a vehicle; a branch point recognition unit which recognizes a branch point present in a traveling direction of the vehicle on the basis of the recognition result of the surrounding situation recognition unit; a main lane recognition unit which recognizes a main lane connected to the branch point; and a driving control unit which controls one or both of the steering and acceleration/deceleration of the vehicle and causes the vehicle to travel in the direction of the main lane recognized by the main lane recognition unit at the branch point.

(2): In the aspect (1), the surrounding situation recognition unit recognizes positions of lane markings or road edges in the traveling direction of the vehicle, and the main lane recognition unit recognizes the main lane connected to the branch point on the basis of the positions of lane markings or road edges recognized by the surrounding situation recognition unit.

(3): In the aspect (1), the surrounding situation recognition unit recognizes at least positions of road edges in the traveling direction of the vehicle, and the branch point recognition unit recognizes a branch point present in the traveling direction of the vehicle on the basis of the extent of a road width derived on the basis of the positions of road edges recognized by the surrounding situation recognition unit.

(4): In the aspect (1), the surrounding situation recognition unit recognizes at least positions of road edges in the traveling direction of the vehicle, and the branch point recognition unit recognizes a branch point present in the traveling direction of the vehicle on the basis of the presence or absence of a crossing point at which the position of a road edge in the traveling direction of the vehicle protrudes to a side close to the vehicle when viewed from the vehicle.

(5): In the aspect (1), the main lane recognition unit recognizes a lane having a curvature continuous with respect to a lane on a side close to the branch point as the main lane.

(6): In the aspect (1), the main lane recognition unit recognizes a lane in which a steering angle necessary for traveling is predicted to be continuous with respect to a lane at a side close to the branch point as the main lane.

(7): A vehicle control method according to one aspect of the present invention is a vehicle control method performed by a computer mounted in a vehicle, including: a surrounding situation recognition unit recognizing a situation of surroundings of the vehicle; a branch point recognition unit recognizing a branch point present in a traveling direction of the vehicle on the basis of the recognition result of the surrounding situation recognition unit; a main lane recognition unit recognizing a main lane connected to the branch point; and a driving control unit controlling one or both of the steering and acceleration/deceleration of the vehicle and causing the vehicle to travel in the direction of the main lane recognized by the main lane recognition unit at the branch point.

(8): A storage medium according to one aspect of the present invention is a computer readable non-transitory storage medium storing a program for causing a computer to execute: a process of recognizing a situation of surroundings of a vehicle; a process of recognizing a branch point present in a traveling direction of the vehicle on the basis of the recognition result and recognizing a main lane connected to the branch point; a process of controlling one or both of the steering and acceleration/deceleration of the vehicle; and a process of causing the vehicle to travel in the direction of the recognized main lane at the branch point.

According to (1) to (8), the vehicle can pass through a branch road while continuing automated driving.

DETAILED DESCRIPTION OF THE INVENTION

Hereinafter, a vehicle control apparatus, a vehicle control method and a storage medium of the present invention will be described with reference to the drawings. An automated driving vehicle is used in the following description. Automated driving is to control one or both of the steering and acceleration/deceleration of a vehicle such that the vehicle travels without operation of an occupant. Manual driving by an occupant may be performed for an automated driving vehicle. Manual driving controls a travel driving force output device, a brake device and a steering device of a vehicle, which will be described later, according to an operation amount of a driving operator which will be described later.

[Overall Configuration]

Figure 1:
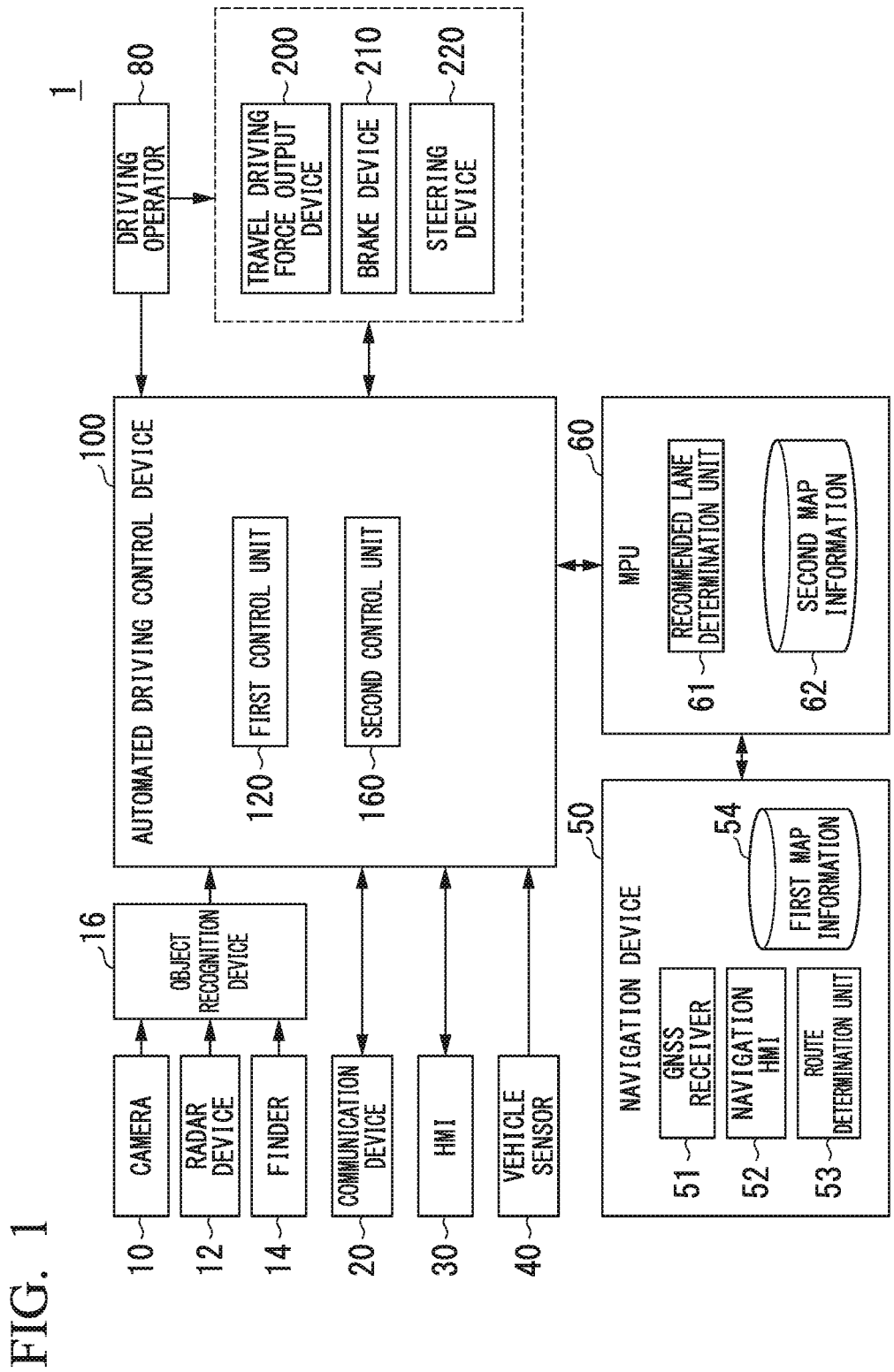
FIG. 1 is a diagram showing a configuration of a vehicle system using a vehicle control apparatus according to an embodiment.

FIG. 1 is a diagram showing a configuration of a vehicle system 1 using a vehicle control apparatus according to an embodiment. A vehicle equipped with the vehicle system 1 is a two-wheeled, three-wheeled or four-wheeled vehicle, for example, and a driving source thereof is an internal combustion engine such as a diesel engine and a gasoline engine, a motor or a combination thereof. In a case that the vehicle includes a motor, the motor operates using power generated by a generator connected to an internal combustion engine or power discharged from a secondary cell or a fuel cell.

For example, the vehicle system 1 may include a camera 10, a radar device 12, a finder 14, an object recognition device 16, a communication device 20, a human machine interface (HMI) 30, a vehicle sensor 40, a navigation device 50, a map positioning unit (MPU) 60, a driving operator 80, an automated driving control device (an example of a vehicle control apparatus) 100, a travel driving force output device 200, a brake device 210 and a steering device 220. These devices and apparatuses are connected to each other through a multi-communication line such as a controller area network (CAN) communication line, a serial communication line, a wireless communication network or the like. The components shown in FIG. 1 are exemplary, and some of the components may be omitted or other components may also be added.

The camera 10 is a digital camera using a solid-state image sensing device such as a charge coupled device (CCD) and a complementary metal oxide semiconductor (CMOS), for example. One or more cameras 10 are attached to any location on a vehicle (hereinafter referred to as a host vehicle M) equipped with the vehicle system 1. In a case that a front view image is captured, the camera 10 is attached to a front end part of the car body of the host vehicle M, an upper portion of a front windshield, the rear side of an interior mirror, or the like. For example, the camera 10 may periodically repeatedly capture images of the surroundings of the host vehicle M. The camera 10 may be a stereo camera.

The radar device 12 radiates radio waves such as millimeter-waves to the surroundings of the host vehicle M and detects radio waves (reflected waves) reflected by an object to detect at least the position (distance to and orientation) of the object. One or more radar devices 12 are attached to any location on the host vehicle M. The radar device 12 may detect the position and the speed of an object according to a frequency modulated continuous wave (FM-CW) method.

The finder 14 is a light detection and ranging (LIDAR) device. The finder 14 radiates light to the surroundings of the host vehicle M and measures scattered light. The finder 14 detects a distance to a target on the basis of a time from light emission to light reception. The radiated light is a pulse-shaped laser light, for example. One or more finders 14 are attached to any location on the host vehicle M.

The object recognition device 16 recognizes the position, type, speed and the like of an object by performing sensor fusion processing on detection results of some or all of the camera 10, the radar device 12 and the finder 14. The object recognition device 16 outputs a recognition result to the automated driving control device 100. The object recognition device 16 may output detection results of the camera 10, the radar device 12 and the finder 14 as they are to the automated driving control device 100 as necessary.

The communication device 20 communicates with other vehicles present around the host vehicle M using a cellular network, a Wi-Fi network, Bluetooth (registered trademark), dedicated short range communication (DSRC) or the like, or communicates with various server devices through a wireless base station, for example.

The HMI 30 presents various types of information to an occupant of the host vehicle M and receives an input operation of the occupant. The HMI 30 includes various display devices, a speaker, a buzzer, a touch panel, a switch, a key and the like.

The vehicle sensor 40 includes a vehicle speed sensor which detects the speed of the host vehicle M, an acceleration sensor which detects an acceleration, a yaw rate sensor which detects an angular velocity around a vertical axis, an orientation sensor which detects a direction of the host vehicle M, and the like.

The navigation device 50 includes a global navigation satellite system (GNSS) receiver 51, a navigation HMI 52 and a route determination unit 53, for example, and has first map information 54 stored in a storage device such as a hard disk drive (HDD) or a flash memory. The GNSS receiver 51 identifies the position of the host vehicle M on the basis of signals received from a GNSS satellite. The position of the host vehicle M may be identified or complemented by an inertial navigation system (INS) using an output of the vehicle sensor 40. The navigation HMI 52 includes a display device, a speaker, a touch panel, a key and the like. All or part of the navigation HMI 52 may be combined with the aforementioned HMI 30. For example, the route determination unit 53 may determine a route (hereinafter referred to as a route on a map) from the position of the host vehicle M identified by the GNSS receiver 51 (or any input position) to a destination input by an occupant using the navigation HMI 52 with reference to the first map information 54. The first map information 54 is information representing road shapes according to links indicating roads and nodes connected by links, for example. The first map information 54 may include curvatures of roads, point of interest (POI) information, and the like. The route on the map determined by the route determination unit 53 is output to the MPU 60. The navigation device 50 may perform route guidance using the navigation HMI 52 on the basis of the route on the map determined by the route determination unit 53. For example, the navigation device 50 may be realized by a function of a terminal device such as a smartphone or a tablet terminal carried by an occupant. The navigation device 50 may transmit a current location and a destination to a navigation server through the communication device 20 and acquire a route on the map received from the navigation server as a reply.

The MPU 60 serves as a recommended lane determination unit 61, for example, and has second map information 62 stored in a storage device such as an HDD or a flash memory. The recommended lane determination unit 61 divides a route provided by the navigation device 50 into a plurality of blocks (divides the route into intervals of 100 m in a vehicle traveling direction, for example) and determines a recommended lane for each block with reference to the second map information 62. The recommended lane determination unit 61 performs determination in such a manner that on which lane from the left the vehicle will travel is determined. In a case that a route includes a branch point, a merging point or the like, the recommended lane determination unit 61 determines a recommended lane such that the host vehicle M can travel on a reasonable route for traveling to a branch destination.

The second map information 62 is map information with higher-accuracy than the first map information 54. For example, the second map information 62 may include information on the centers of lanes, information on the boundaries of lanes, or the like. The second map information 62 may include road information, traffic regulations information, address information (addresses and zip codes), facility information, telephone number information and the like. The second map information 62 may be updated by accessing other devices using the communication device 20 at any time.

The driving operator 80 includes an accelerator pedal, a brake pedal, a shift lever, a steering wheel, a modified steering wheel, a joystick and other operators, for example. A sensor which detects an operation amount or presence or absence of an operation is attached to the driving operator 80 and a detection result is output to one or both of the automated driving control device 100, and the travel driving force output device 200, the brake device 210 and the steering device 220.

For example, the automated driving control device 100 may include a first control unit 120 and a second control unit 160. Each of the first control unit 120 and the second control unit 160 is realized by executing a program (software) through a hardware processor such as a central processing unit (CPU), for example. Some or all of these components may be realized by hardware (circuit unit; including circuitry) such as a large scale integration (LSI), an application specific integrated circuit (ASIC), a field-programmable gate array (FPGA) and a graphics processing unit (GPU) or realized by software and hardware in cooperation.

Figure 2:
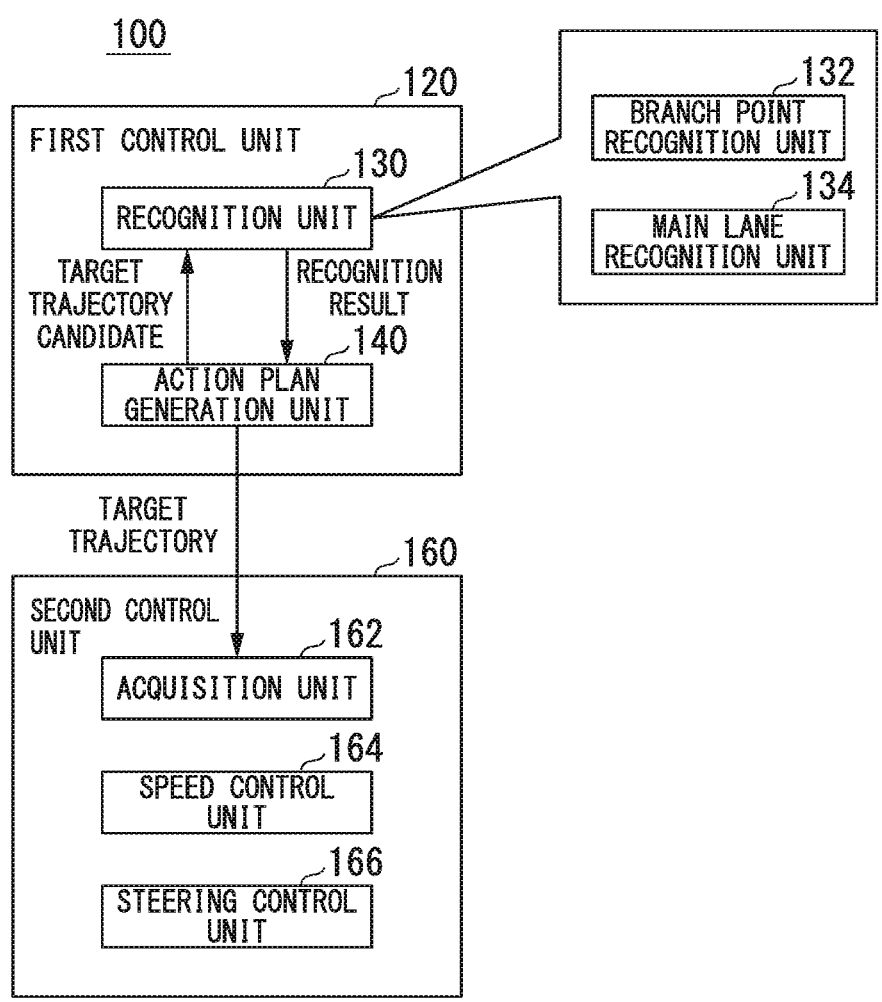
FIG. 2 is a diagram showing a functional configuration of a first control unit and a second control unit.

FIG. 2 is a diagram showing a functional configuration of the first control unit 120 and the second control unit 160. The first control unit 120 includes a recognition unit 130 and an action plan generation unit 140, for example. The recognition unit 130 includes a branch point recognition unit 132 and a main lane recognition unit 134, for example. The recognition unit 130 is an example of a "surrounding situation recognition unit." A combination of the action plan generation unit 140 and the second control unit 160 is an example of a "driving control unit."

The first control unit 120 realizes a function using artificial intelligence (AI) and a function using a model provided in advance in parallel, for example. For example, a function of "recognizing an intersection" is realized by performing recognition of an intersection according to an image recognition method using deep learning or the like and recognition based on predetermined conditions (a signal which can be pattern-matched, road markings and the like) in parallel and assigning scores to both the recognitions to integrally evaluate the recognitions.

Accordingly, reliability of automated driving is guaranteed.

The recognition unit 130 recognizes a situation around the host vehicle M on the basis of information input from the camera 10, the radar device 12 and the finder 14 through the object recognition device 16. For example, the recognition unit 130 recognizes states such as the position, speed and acceleration of an object around the host vehicle. The object may include other vehicles or fixed obstacles. For example, the position of the object may be recognized as a position on absolute coordinates having a representative point (the center of gravity, the center of the drive shaft or the like) of the host vehicle M as the origin and used for control. The position of the object may be represented as a representative point of the object, such as the center of gravity or a corner, or may be represented as a representative region. In a case that the object is another vehicle, "states" of the object may include the acceleration and jerk of the object or an "action state" (e.g., whether lane change is being performed or is intended to be performed). The recognition unit 130 recognizes a shape of a curve along which the host vehicle M will subsequently pass on the basis of a captured image of the camera 10. The recognition unit 130 converts the shape of the curve from the captured image of the camera 10 into a real plane and outputs, for example, two-dimensional point sequence information or information represented using a model equivalent to two-dimensional points sequence information to the action plan generation unit 140 as information representing the shape of the curve.

The recognition unit 130 recognizes a lane (traveling lane) in which the host vehicle M is traveling. For example, the recognition unit 130 may recognize a traveling lane by comparing a lane marking pattern (e.g., arrangement of solid lines and dashed lines) obtained from the second map information 62 with a lane marking pattern around the host vehicle M recognized from an image captured by the camera 10. The recognition unit 130 may recognize a traveling lane by recognizing lane boundaries (road boundaries) including lane markings, road shoulders, curbs, medians, guardrails and the like as well as lane markings. In such recognition, the position of the host vehicle M acquired from the navigation device 50 and a processing result of the INS may be additionally taken into account. The recognition unit 130 recognizes stop lines, traffic signs, signals, tollgates and other road states.

The recognition unit 130 recognizes a position and a posture of the host vehicle M with respect to a traveling lane when the traveling lane is recognized. For example, the recognition unit 130 may recognize a distance between a reference point of the host vehicle M and the center of the lane and an angle between a traveling direction of the host vehicle M and a line connecting the center of the lane as a relative position and attitude of the host vehicle M with respect to the traveling lane. Instead of this, the recognition unit 130 may recognize the position of the reference point of the host vehicle M or the like with respect to any side edge of the traveling lane (a lane marking or a road boundary) as a relative position of the host vehicle M with respect to the traveling lane.

The recognition unit 130 may derive recognition accuracy and output the recognition accuracy to the action plan generation unit 140 as recognition accuracy information in the above-described recognition process. For example, the recognition unit 130 generates recognition accuracy information on the basis of the frequency of recognition of a lane marking in a predetermined period. Functions of the branch point recognition unit 132 and the main lane recognition unit 134 of the recognition unit 130 will be described later.

The action plan generation unit 140 generates a target trajectory through which the host vehicle M will travel in the future such that the host vehicle M travels in a recommended lane determined by the recommended lane determination unit 61 in principle and automated driving corresponding to a surrounding situation of the host vehicle M is performed. The target trajectory includes a speed factor, for example. The target trajectory is represented as an arrangement of points (trajectory points) in order at which the host vehicle M will arrive, for example.

The second control unit 160 includes an acquisition unit 162, a speed control unit 164 and a steering control unit 166, for example. The acquisition unit 162 acquires information on a target trajectory (trajectory points) generated by the action plan generation unit 140 and stores the information in a memory (not shown). The speed control unit 164 controls the travel driving force output device 200 or the brake device 210 on the basis of a speed factor associated with the target trajectory stored in the memory. The steering control unit 166 controls the steering device 220 according to a degree of curvature of the target trajectory stored in the memory. Processing of the speed control unit 164 and the steering control unit 166 is realized by feedforward control and feedback control in combination, for example. As an example, the steering control unit 166 performs feedforward control according to a curvature of a road in front of the host vehicle M and feedback control based on a distance from a target trajectory in combination.

The travel driving force output device 200 outputs a travel driving force (torque) for traveling of a vehicle to driving wheels. For example, the travel driving force output device 200 may include a combination of an internal combustion engine, a motor, a transmission and the like, and an ECU which controls combination thereof. The ECU controls the aforementioned components according to information input from the second control unit 160 or information input from the driving operator 80.

The brake device 210 includes a brake caliper, a cylinder which transfers a hydraulic pressure to the brake caliper, an electric motor which generates a hydraulic pressure in the cylinder, and a brake ECU, for example. The brake ECU controls the electric motor according to information input from the second control unit 160 and information input from the driving operator 80 such that a brake torque according to the control operation is output to each vehicle wheel. The brake device 210 may include a mechanism for transferring an oil pressure generated by an operation of the brake pedal included in the driving operator 80 to the cylinder through a master cylinder as a backup. The brake device 210 is not limited to the above-described configuration and may be an electronically controlled hydraulic brake device which controls an actuator according to information input from the second control unit 160 and transfers an oil pressure of a master cylinder to a cylinder.

The steering device 220 includes a steering ECU and an electric motor, for example. The electric motor changes the direction of the steering wheel by applying a force to a rack-and-pinion mechanism. The steering ECU drives the electric motor according to information input from the second control unit 160 or information input from the driving operator 80 and changes the direction of the steering wheel.

[Functions of Branch Point Recognition Unit and Main Lane Recognition Unit]

Next, functions of the branch point recognition unit and the main lane recognition unit 134 will be described. It is assumed that the host vehicle M performs automated driving along the road in the description below. For example, automated driving along the road is driving control for traveling in a main lane of a road without an operation of an occupant until stop of automated driving is instructed by the occupant or a system. For example, automated driving along the road applied to the present embodiment may include "cases in which automated driving along the road is performed in an automated driving vehicle having full specifications in a condition in which no schedule to travel to a branch destination is generated in advance," "cases in which automated driving along the road is performed as fail-safe when the host vehicle M cannot recognize a lane in which the host vehicle M is traveling," "cases in which automated driving along the road is performed according to an instruction of an occupant or the like" and the like.

The branch point recognition unit 132 recognizes a branch point present in a traveling direction of the host vehicle M on the basis of a result of recognition of a surrounding situation of the host vehicle M obtained by the recognition unit 130. The main lane recognition unit 134 recognizes a main lane connected to the branch point among two or more lanes branched off from the branch point recognized by the branch point recognition unit 132. The action plan generation unit 140 generates a target trajectory along which the host vehicle M will travel in the main lane recognized by the main lane recognition unit 134 and causes the host vehicle M to travel along the target trajectory. In the following example, a case in which two lanes are branched off from a branch point will be described.

Figure 3:
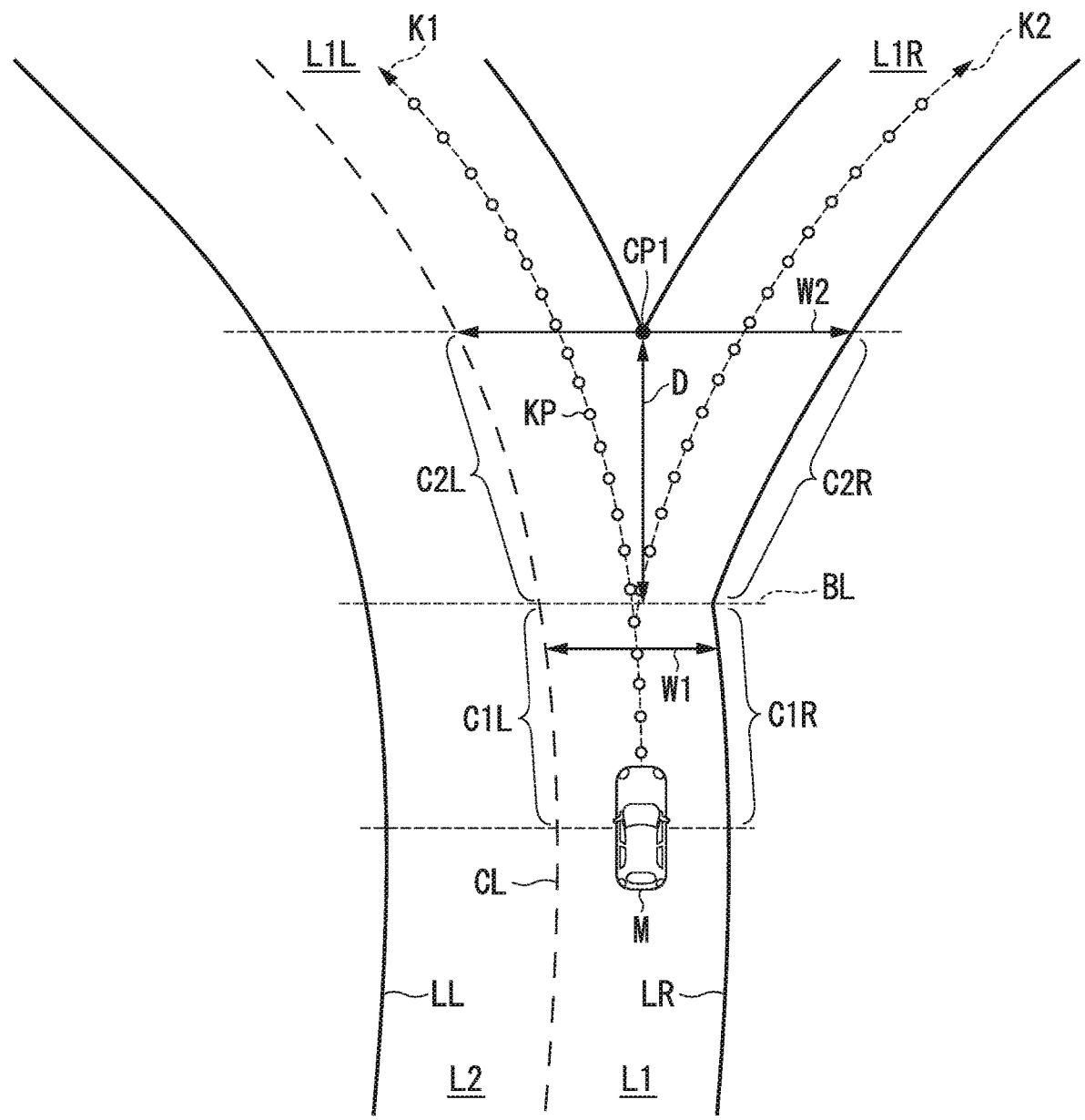
FIG. 3 is a diagram for describing details of processing of a branch point recognition unit and a main lane recognition unit.

FIG. 3 is a diagram for describing details of processing of the branch point recognition unit 132 and the main lane recognition unit 134. In the example of FIG. 3, lanes L1 and L2 in the same direction are represented and a state in which the lane L1 is branched to two lanes L1L and L1R is represented.

Figure 4:
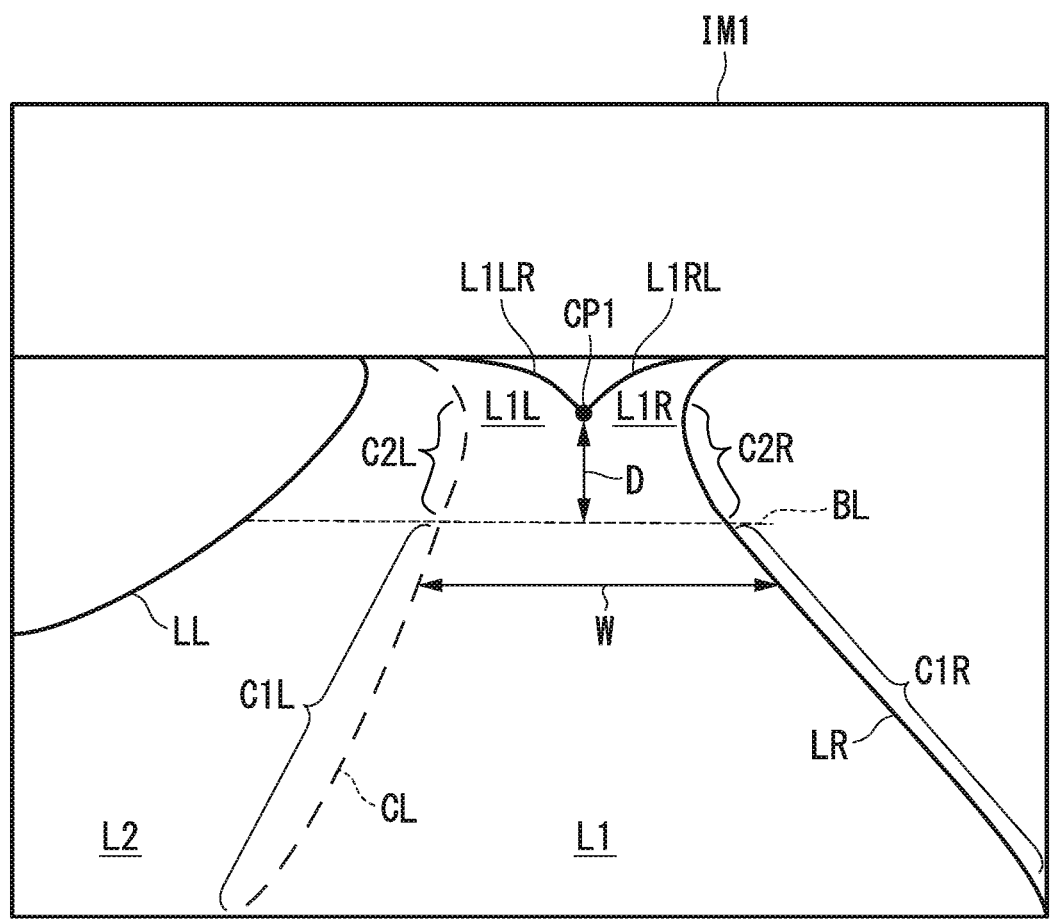
FIG. 4 is a diagram showing an example of a captured image of a camera.

The recognition unit 130 recognizes the positions of lane markings or road edges in a traveling direction of the host vehicle M on the basis of a captured image of the camera 10, for example. FIG. 4 is a diagram showing an example of a captured image of the camera 10. The recognition unit 130 extracts edge parts according to image analysis of a captured image IM1 shown in FIG. 4 and recognizes lane markings or road edges from edge lines connecting the extracted edges. In the example of FIG. 4, a right edge LR and a left edge CL of a road of a lane L1 which is a traveling lane of the host vehicle M are recognized according to image analysis of the captured image IM1. The left edge CL is a lane for partitioning the lanes L1 and L2. The recognition unit 130 may recognize the left edge LL of the lane L2.

The branch point recognition unit 132 recognizes a road width W of the lane L1 in the traveling direction, which is derived on the basis of the positions of the left and right road edges LL and CL of the lane L1 recognized by the recognition unit 130. In addition, the branch point recognition unit 132 recognizes a branch point present in the traveling direction of the host vehicle M on the basis of the extent of the recognized road width. For example, the branch point recognition unit 132 recognizes presence of a branch point of the lane L1 when the recognized road width W of the lane L1 is wider than the lane width of the lane L1 in which the host vehicles M has traveled so far by a predetermined width or more (e.g., about twice the width of the lane L1 in which the host vehicle M has traveled so far).

For example, the branch point recognition unit 132 may recognize the road width W of the lane L1 in which the host vehicle M is traveling in the traveling direction when the captured image IM1 of the camera 10 has been analyzed and projected to the real space. In addition, the branch point recognition unit 132 recognizes presence of a branch point when a road width W2 having an area more than twice the road width W1 is recognized, as shown in FIG. 3. For example, the branch point recognition unit 132 may recognize a position at a side close to the host vehicle M a predetermined distance D from the position at which the road width W2 is recognized as a branch point.

The branch point recognition unit 132 may recognize a branch point present in the traveling direction of the host vehicle M on the basis of presence or absence of a crossing point at which the position of a road edge in the traveling direction of the host vehicle M protrudes to a side close to the host vehicle M when viewed from the host vehicle M.

For example, the branch point recognition unit 132 may extract edges representing lane markings or road edges according to image analysis of the captured image IM1 and, when edge lines connecting the edges intersect at an acute angle at a side close to the host vehicle M, recognize the intersection point as a crossing point. In the example of FIGS. 3 and 4, the branch point recognition unit 132 recognizes a point at which an edge line L1LR of the right edge of the lane L1L and an edge line L1RL of the left edge of the lane L1R intersect at an acute angle at a side close to the host vehicle M as a crossing point CP1. The branch point recognition unit 132 recognizes that a branch point is present in a predetermined place at a side close to the host vehicle M with respect to the crossing point CP1. In the following, it is assumed that the main lane recognition unit 134 recognizes a position at a side close to the host vehicle M by a predetermined distance D from the crossing point CP1 as a branch point BL, as shown in FIGS. 3 and 4.

In a case that a branch point has been recognized by the branch point recognition unit 132, the main lane recognition unit 134 recognizes which one of the two branched lanes L1L and L1R is a lane at the side of the main lane. For example, the main lane recognition unit 134 recognizes a lane whose recognized curvature is continuous with respect to a lane in front of the branch point BL recognized by the branch point recognition unit 132.

In the example of FIG. 4, the main lane recognition unit 134 analyzes the captured image IM1 of the camera 10 to recognize a curvature C1L when a target section at a side closer to the host vehicle M relative to the branch point BL has been projected to the real space and a curvature C2L when a target section before the branch point BL has been projected to the real space with respect to the left edge CL of the lane L1. For example, the main lane recognition unit 134 recognizes the curvatures C1L and C2L by fitting an edge line in the target sections at the left edge CL of the lane L1 to an arc.

Then, the main lane recognition unit 134 determines whether the curvatures of the lane L1 and the lane L1L are continuous using the curvatures C1L and C2L. For example, the main lane recognition unit 134 determines that the curvatures of the lane L1 and the lane L1L are continuous when a difference $\Delta C1$ (=C2L−C1L) between the curvatures C1L and C2L is equal to or less than a threshold value and determines that the curvatures of the lane L1 and the lane L1L are not continuous when the difference $\Delta C1$ exceeds the threshold value.

The main lane recognition unit 134 recognizes a curvature C1R when the target section at a side closer to the host vehicle M than the branch point BL has been projected to the real space and a curvature C2R when the target section before the branch point BL has been projected to the real space with respect to the right edge RL of the lane L1. Then, the main lane recognition unit 134 determines that the curvatures of the lane L1 and the lane L1R are continuous when a difference $\Delta C2$ (=C2R−C1R) between the recognized curvatures C1R and C2R is equal to or less than a threshold value and determines that the curvatures of the lane L1 and the lane L1R are not continuous when the difference $\Delta C2$ exceeds the threshold value.

The main lane recognition unit 134 may compare the difference $\Delta C1$ between the curvatures C1L and C2L with the difference $\Delta C2$ between the curvatures C1R and C2R and determine that a lane having a smaller difference is a lane having a continuous curvature. In the example of FIGS. 3 and 4, the main lane recognition unit 134 recognizes the lane L1L at the left side as a main lane because the difference $\Delta C1$ is smaller than the $\Delta C2$.

The main lane recognition unit 134 may recognize a lane in which a steering angle of the host vehicle M necessary for traveling is predicted to be continuous with respect to lanes at a side close to the branch point BL as a main lane instead of (or in addition to) the above-described recognition of a main lane on the basis of curvatures of lanes. In this case, the main lane recognition unit 134 predicts changes in the steering angle in the future on the basis of a target trajectory candidate K1 for traveling along the lane L1L and a target trajectory candidate K2 for traveling along the lane L1R generated in parallel by the action plan generation unit 140.

Figure 5:
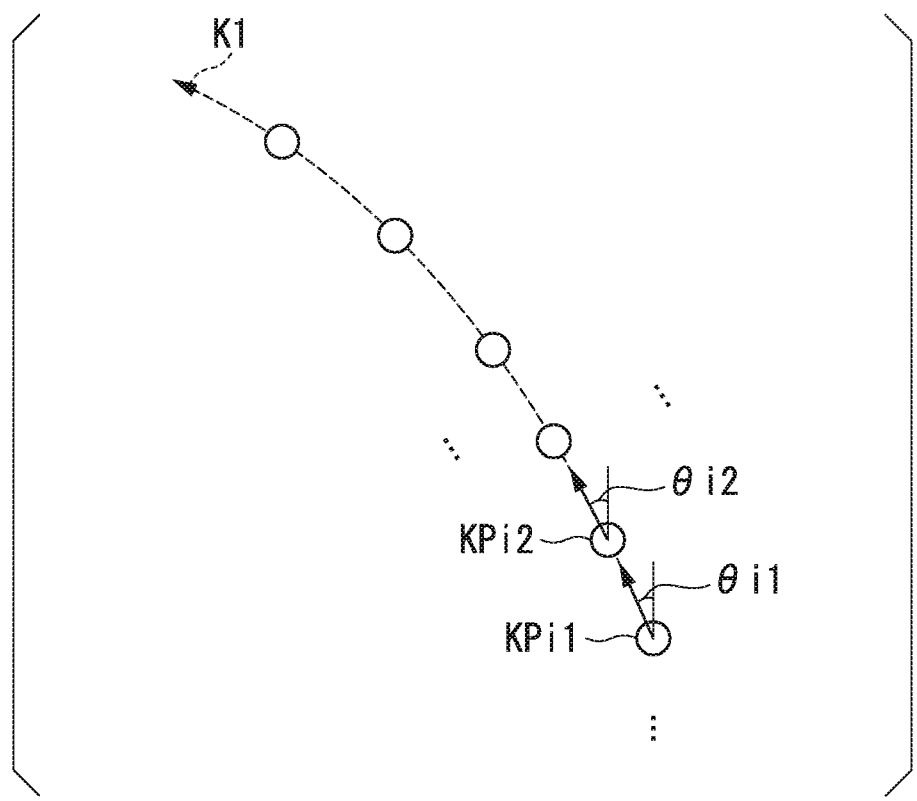
FIG. 5 is a diagram for describing prediction of a steering angle.
Figure 6:
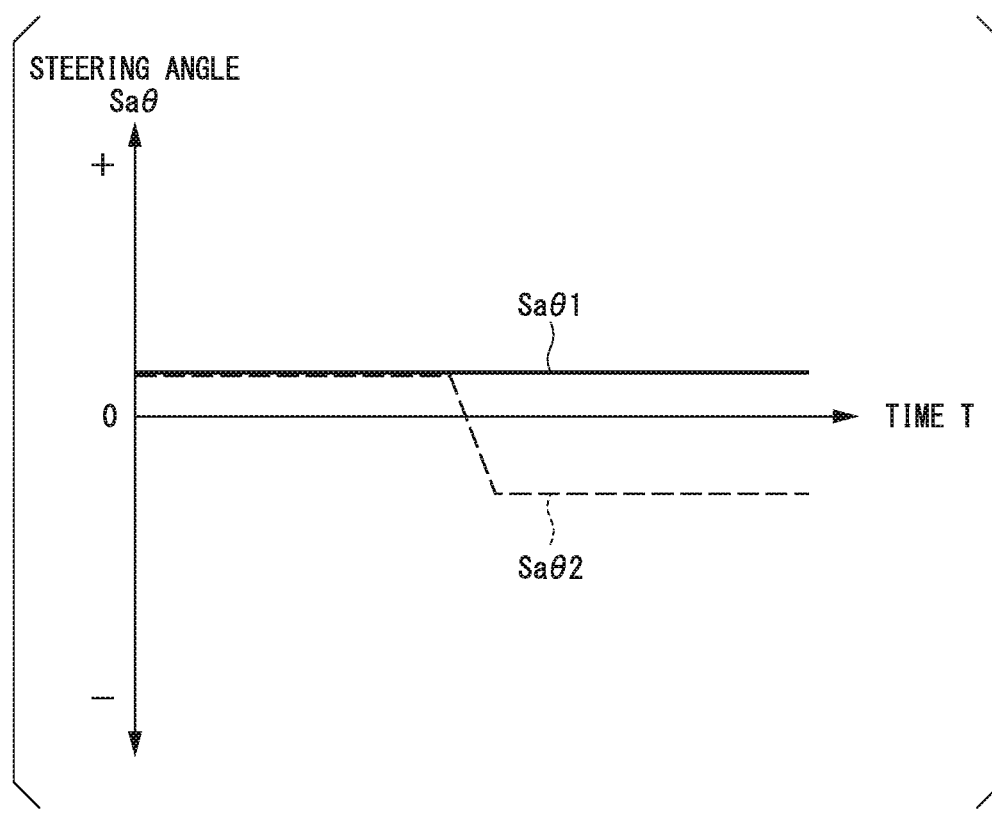
FIG. 6 is a diagram for describing changes in a predicted steering angle.

FIG. 5 is a diagram for describing prediction of a steering angle. In the example of FIG. 5, turning angles $\theta i1$, $\theta i2$, . . . at trajectory points KPi1, KPi2, . . . included in the target trajectory candidate K1 are represented. The main lane recognition unit 134 derives a steering angle $Sa\theta$ for each trajectory point on the basis of the turning angle $\theta i1$ and the traveling speed of the host vehicle M with respect to a lane at a side close to the crossing point CP1 which is a branch point. The main lane recognition unit 134 derives a steering angle $Sa\theta$ for each trajectory point from a turning angle between trajectory points with respect to the target trajectory candidate K2 in the same manner FIG. 6 is a diagram for describing predicted changes in the steering angle $Sa\theta$. In FIG. 6, $Sa\theta 1$ represents a steering angle in the target trajectory candidate K1 and $Sa\theta 2$ represents a steering angle in the target trajectory candidate K2.

For example, the main lane recognition unit 134 acquires a displacement amount of the steering angle for each predetermined time and determines that the displacement of the steering angle is continuous in a case that the acquired displacement amount is equal to or less than a predetermined amount. The main lane recognition unit 134 determines that the displacement amount of the steering angle is not continuous in a case that the acquired displacement amount exceeds the predetermined amount. In the example of FIG. 6, a displacement amount of the steering angle $Sa\theta 1$ in the target trajectory candidate K1 is equal to or less than the predetermined amount and a displacement amount of the steering angle $Sa\theta 2$ in the target trajectory candidate K2 exceeds the predetermined amount. Accordingly, the main lane recognition unit 134 recognizes the target trajectory candidate K1 as a target trajectory at the side of the main lane.

In a case that both the displacement amounts of the steering angle $Sa\theta 1$ and the steering angle $Sa\theta 2$ are equal to or less than the predetermined amount or exceed the predetermined amount, the main lane recognition unit 134 may recognize a target trajectory candidate having a smaller steering angle displacement amount as a target trajectory at the side of the main lane.

Accordingly, the host vehicle M can recognize the main lane and travel therein without referring to map information of the navigation device 50 and the like. In a case that there is an error in recognition of the position of the host vehicle M and the like, or in a road situation in which the position of the host vehicle M cannot be correctly recognized because the host vehicle M is traveling in a tunnel, it is possible to recognize a branch point more accurately and to cause the host vehicle M to travel along the main lane.

[Process Flow]

Figure 7:
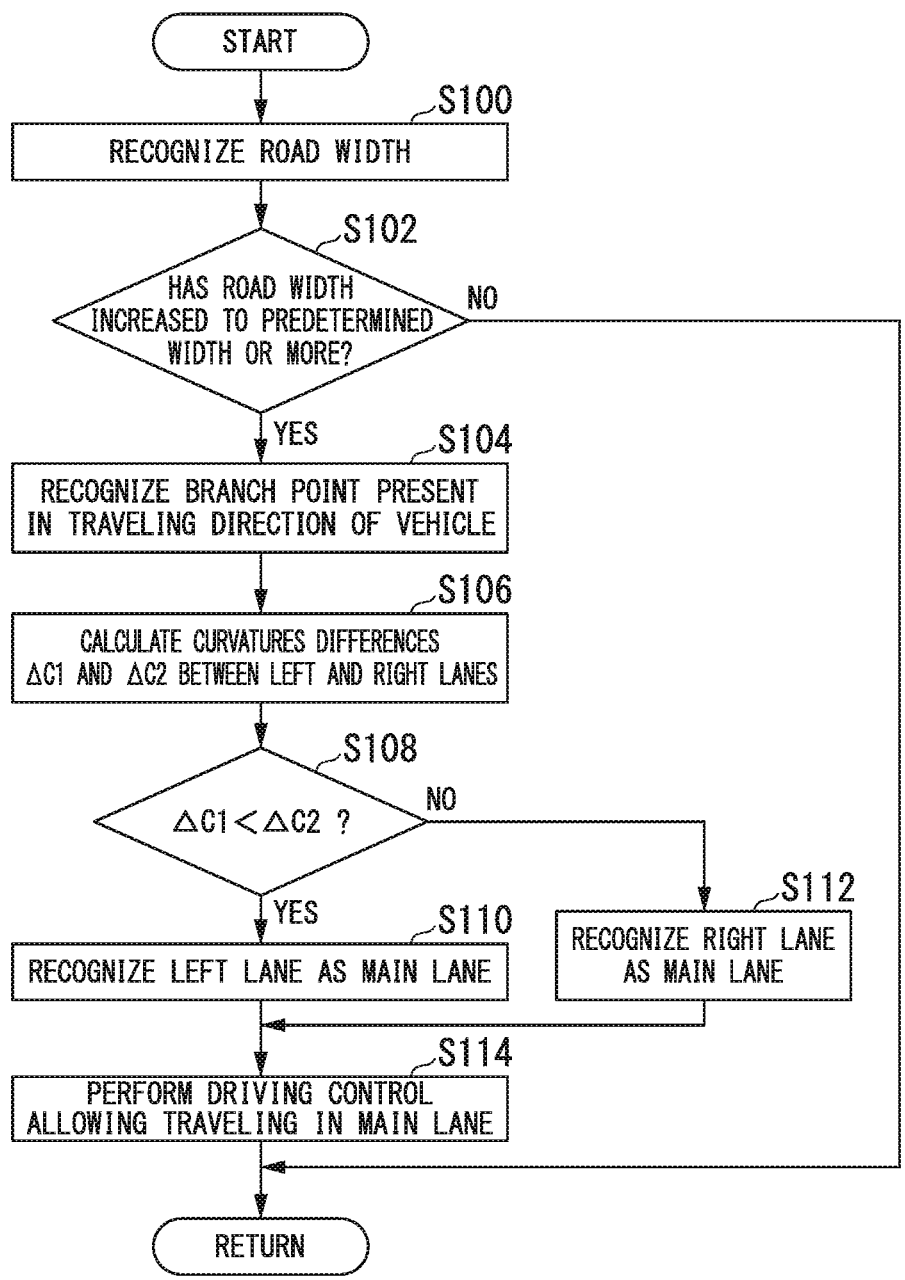
FIG. 7 is a flowchart showing an example of a process performed by an automated driving control device of an embodiment.

FIG. 7 is a flowchart showing an example of a process performed by the automated driving control device 100 of the embodiment. The flowchart shown in FIG. 7 is a process repeatedly performed in a procedure in which the host vehicle M travels to a destination along a target trajectory generated by the action plan generation unit 140. First, the recognition unit 130 recognizes a road width of a lane in which the host vehicle M is traveling in a traveling direction (step S100).

Then, the branch point recognition unit 132 determines whether the road width has increased to a predetermined width or more on the basis of the recognized road width (step S102). In a case that the recognized road width has increased to the predetermined width or more, the branch point recognition unit 132 recognizes a point at which the recognized road width has increased to the predetermined width or more as a branch point present in the traveling direction of the host vehicle M (step S104).

Subsequently, the main lane recognition unit 134 calculates differences ΔC1 and ΔC2 between the curvature of a lane at a side close to the branch point BL and the curvatures of left and right lanes branched off from the branch point BL (step S106). Then, the main lane recognition unit 134 determines whether the curvature difference ΔC1 is less than ΔC2 (step S108).

In a case that it is determined that the curvature difference ΔC1 is less than the curvature ΔC2, the main lane recognition unit 134 recognizes the left lane after branching as a main lane (step S110). In a case that it is determined that the curvature difference ΔC1 is equal to or greater than the curvature ΔC2, the main lane recognition unit 134 recognizes the right lane after branching as a main lane (step S112). Subsequently, the action plan generation unit 140 generates a target trajectory through which the host vehicle M travels in the main lane and the second control unit 160 performs driving control for causing the host vehicle M to travel in the main lane on the basis of the generated target trajectory (step S114). Accordingly, the process of this flowchart ends. In the process of step S102, in a case that it is determined that the road width has not increased to the predetermined width or more, the process of this flowchart ends.

According to the above-described embodiment, the host vehicle M can pass through a branch road while continuing automated driving by including the recognition unit 130 which recognizes surrounding situations of the host vehicle, the branch point recognition unit 132 which recognizes a branch point present in a traveling direction of the host vehicle M on the basis of the recognition result of the recognition unit 130, the main lane recognition unit 134 which recognizes a main lane connected to the branch point, and the second control unit 160 which controls one or both of the steering and acceleration/deceleration of the host vehicle M and causes the host vehicle M to travel in the direction of the main lane recognized by the main lane recognition unit 134 at the branch point. Accordingly, it is also possible to realize automated driving along the road of the host vehicle M in a case that the host vehicle M passes through a branch road.

[Hardware Configuration]

Figure 8:
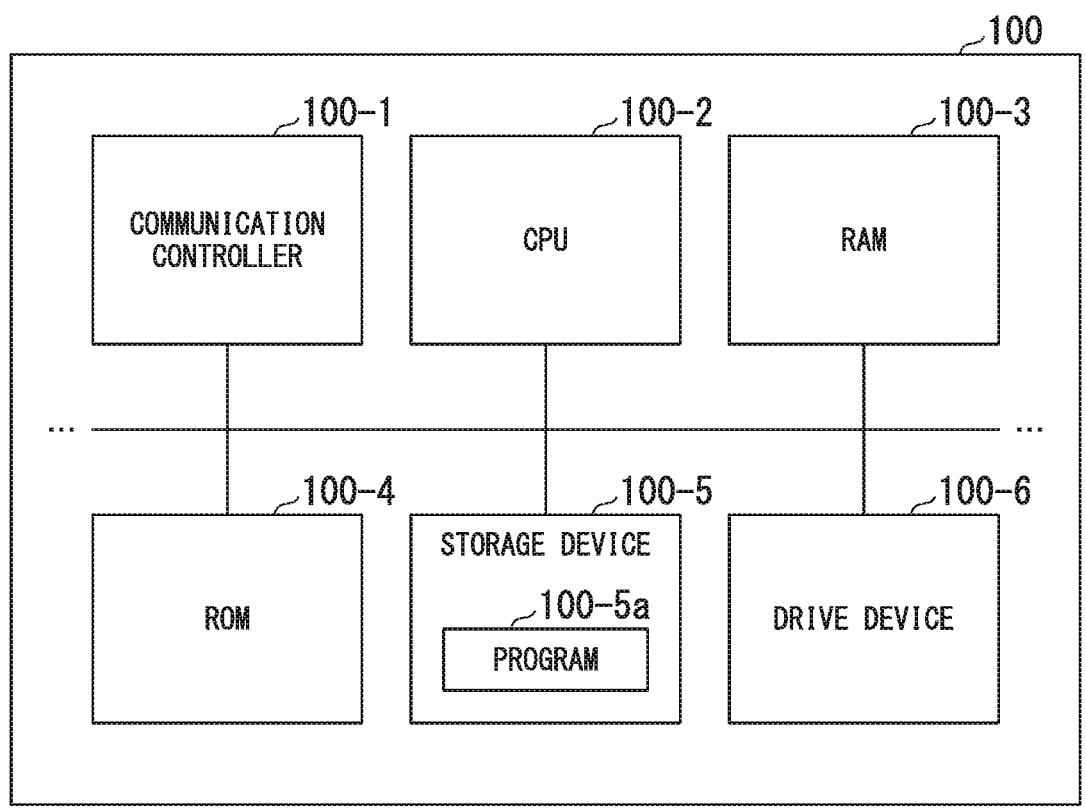
FIG. 8 is a diagram showing an example of a hardware configuration of the automated driving control device of the embodiment.

The automated driving control device 100 of the above-described embodiment is realized in a hardware configuration as shown in FIG. 8, for example. FIG. 8 is a diagram showing an example of a hardware configuration of the automated driving control device 100 of the embodiment.

The automated driving control device 100 has a configuration in which a communication controller 100-1, a CPU 100-2, a RAM 100-3, a ROM 100-4, a storage device 100-5 such as a flash memory or an HDD, and a drive device 100-6 are connected through an internal bus or a dedicated communication line. The drive device 100-6 is equipped with a portable storage medium such as an optical disc. A program 100-5a stored in the storage device 100-5 is developed in the RAM 100-3 according to a DMA controller (not shown) or the like and executed by the CPU 100-2 to realize the first control unit 120 and the second control unit 160. A program referred to by the CPU 100-2 may be stored in the portable storage medium provided in the drive device 100-6 or downloaded from other devices through a network NW.

The above-described embodiment may be realized as follows.

A vehicle control apparatus including:
a storage device which stores information; and
a hardware processor which executes a program stored in the storage device,
wherein the hardware processor is configured, by executing the program;
to recognize a surrounding situation of a vehicle;
to recognize a branch point present in a traveling direction of the vehicle on the basis of the recognition result;
to recognize a main lane connected to the branch point; and
to control one or both of the steering and acceleration/deceleration of the vehicle such that the vehicle travels in the direction of the recognized main lane at the branch point.

While forms for embodying the present invention have been described using embodiments, the present invention is not limited to these embodiments and various modifications and substitutions can be made without departing from the spirit or scope of the present invention.

What is claimed is:

1. A vehicle control apparatus comprising:
a processor; and
a memory that stores instructions, that when executed by the processor, causes performance of operations, comprising:
determining a situation associated with a surroundings of a vehicle;
determining a branch point present in a traveling direction of the vehicle based on the situation;
determining a main lane connected to the branch point; and
causing control of one or both of steering and acceleration/deceleration of the vehicle and causing the vehicle to travel in a direction of the main lane at the branch point,
wherein the main lane is determined based on a steering angle required for traveling being continuous with respect to a lane at the branch point, wherein the steering angle is determined as being continuous when an anticipated displacement or change in the steering angle is small as a road approaches and after passing the branch point, and wherein the steering angle is predicted into a future based on a target trajectory candidate for the vehicle on each lane of multiple lanes after passing the branch point.

2. The vehicle control apparatus according to claim 1, wherein the operations further comprise determining positions of lane markings or road edges in the traveling direction, and determining the main lane connected to the branch point based on the positions of lane markings or road edges.

3. The vehicle control apparatus according to claim 1, wherein the operations further comprise determining at least positions of road edges in the traveling direction, and determining that the branch point is present in the traveling direction based on an extent of a road width determined based on the positions of road edges.

4. The vehicle control apparatus according to claim 1, wherein the operations further comprise determining at least positions of road edges in the traveling direction, and determining that the branch point is present in the traveling direction based on a presence or an absence of a crossing point where a position of a road edge of the positions of road edges in the traveling direction protrudes to a path of the vehicle.

5. The vehicle control apparatus according to claim 1, wherein the operations further comprise determining a first lane having a first curvature continuous with respect to a second curvature of a second lane at a side proximate to the branch point as being the main lane.

6. A vehicle control method performed by a computer mounted in a vehicle, comprising;
   a processor; and
   a memory that stores instructions that, when executed by the processor, cause performance of operations, the method comprising:
   determining a situation associated with a surroundings of the vehicle;
   determining a branch point present in a traveling direction of the vehicle based on the situation;
   determining a main lane connected to the branch point; and
   controlling one or both of steering and acceleration/deceleration of the vehicle and causing the vehicle to travel in a direction of the main lane at the branch point,
   wherein the main lane is determined based on a steering angle required for traveling being continuous with respect to a lane at the branch point,
   wherein the steering angle is determined as being continuous when an anticipated displacement or change in the steering angle is small as a road approaches and after passing the branch point, and
   wherein the steering angle is predicted into a future based on a target trajectory candidate for the vehicle on each lane of multiple lanes after passing the branch point.

7. A non-transitory computer readable storage medium storing a program for causing a computer comprising a processor to execute:
   determining a situation associated with a surroundings of a vehicle;
   determining a branch point present in a traveling direction of the vehicle based on the situation and determining a main lane connected to the branch point;
   controlling one or both of steering and acceleration/deceleration of the vehicle; and
   causing the vehicle to travel in a direction of the main lane at the branch point
   wherein the main lane is determined based on a steering angle required for traveling being continuous with respect to a lane at the branch point,
   wherein the steering angle is determined as being continuous when an anticipated displacement or change in the steering angle is small as a road approaches and after passing the branch point, and
   wherein the steering angle is predicted into a future based on a target trajectory candidate for the vehicle on each lane of multiple lanes after passing the branch point.

* * * * *